United States Patent
Birbaumer et al.

(10) Patent No.: US 7,134,528 B2
(45) Date of Patent: Nov. 14, 2006

(54) HYDRAULIC ELEVATOR WITH VALVE FOR PREVENTING DISCHARGE OF PRESSURE ACCUMULATOR AND METHOD OF CONTROLLING SAME

(75) Inventors: Hugo Birbaumer, Neuheim (CH); Richard von Holzen, Menzingen (CH)

(73) Assignee: Bucher Hydraulics AG, Neuheim (CH)

( * ) Notice: Subject to any disclaimer, the term of this patent is extended or adjusted under 35 U.S.C. 154(b) by 316 days.

(21) Appl. No.: 10/480,057

(22) PCT Filed: Nov. 7, 2002

(86) PCT No.: PCT/CH02/00599

§ 371 (c)(1),
(2), (4) Date: Dec. 8, 2003

(87) PCT Pub. No.: WO03/042086
PCT Pub. Date: May 22, 2003

(65) Prior Publication Data
US 2004/0173412 A1    Sep. 9, 2004

(30) Foreign Application Priority Data
Nov. 16, 2001  (CH) ..................................... 2107/01

(51) Int. Cl.
*B66B 1/28* (2006.01)
(52) U.S. Cl. ...................... 187/285; 187/275
(58) Field of Classification Search ........ 187/272–275, 187/215, 229, 234, 285–287; 91/452–455, 91/458, 459, 446; 92/DIG. 2; 60/413–418, 60/429, 430, 464
See application file for complete search history.

(56) References Cited

U.S. PATENT DOCUMENTS

| | | | | |
|---|---|---|---|---|
| 2,269,786 A | * | 1/1942 | Rose | 187/274 |
| 3,892,292 A | * | 7/1975 | Takenoshita et al. | 187/275 |
| 3,955,649 A | * | 5/1976 | Takenoshita et al. | 187/285 |
| 5,281,774 A | * | 1/1994 | Masaki | 187/286 |
| 5,349,142 A | | 9/1994 | Hasegawa | |
| 5,419,411 A | | 5/1995 | Hasegawa | |

(Continued)

FOREIGN PATENT DOCUMENTS

DE    40 34 666 A1    10/1991

(Continued)

*Primary Examiner*—Jonathan Salata
(74) *Attorney, Agent, or Firm*—Cohen, Pontani, Lieberman & Pavane

(57) ABSTRACT

A hydraulic elevator with a pressure accumulator includes a pump fir conveying hydraulic oil between the pressure accumulator and a hydraulic drive, such that the direction of rotation of the pump can be changed. An electrically controlled cylinder line stop valve is installed on one side of the pump, and an electrically controlled accumulator line stop valve is installed on the other side of the pump. Both valves are ON-OFF valves. To prevent sudden disruptive pressure changes when the valves are opened before the start of travel of the car, the pressure in the section of the line between the pump and the cylinder line stop valve and in the section of the line between the pump and the accumulator line stop valve can be varied such that, when the car is at a standstill, the pressure differences are largely eliminated before the valves are opened.

24 Claims, 4 Drawing Sheets

U.S. PATENT DOCUMENTS

| | | | |
|---|---|---|---|
| 5,579,868 A * | 12/1996 | Pelto-Huikko | 187/275 |
| 5,648,644 A * | 7/1997 | Nagel | 187/288 |
| 6,142,259 A * | 11/2000 | Veletovac et al. | 187/287 |
| 6,347,515 B1 | 2/2002 | Kadoche | |
| 6,505,711 B1 * | 1/2003 | Zurcher et al. | 187/285 |
| 6,971,481 B1 * | 12/2005 | Moser et al. | 187/285 |
| 2003/0173159 A1 * | 9/2003 | Moser | 187/285 |

FOREIGN PATENT DOCUMENTS

| | | |
|---|---|---|
| EP | 0 829 445 A1 | 12/1996 |
| FR | 2 773 141 A1 | 12/1997 |
| WO | WO 98/34868 | 8/1998 |
| WO | WO 99/33740 | 7/1999 |

* cited by examiner

HYDRAULIC ELEVATOR WITH VALVE FOR PREVENTING DISCHARGE OF PRESSURE ACCUMULATOR AND METHOD OF CONTROLLING SAME

This is a U.S. national stage of application Ser. No. PCT/CH02/00599, filed on 07 Nov. 2002. Priority is claimed on that application and on the following application(s): Country: Switzerland, Application No.: 2107/01, Filed: 16 Nov. 2001.

BACKGROUND OF THE INVENTION

1. Field of the Invention

The invention concerns a hydraulic elevator having a hydraulic drive with a pump connected for controlling the hydraulic drive and a method of controlling and automatically regulating the hydraulic elevator.

2. Description of the Prior Art

DE 40 34 666 A1 and corresponding U.S. Pat. Nos. 5,419,411 and 5,349,142 disclose a hydraulic elevator in which oil is conveyed by a pump between the hydraulic drive for the elevator car and the pressure accumulator, which is called a counterbalance elevator drive in the cited document. Each of the lines from the pump to the drive and from the pump to the pressure accumulator contains a speed control valve, with which the operating curve can be controlled. It is also disclosed that the pump is driven by an electric motor, which is controlled by an inverter.

In EP 829 445 A1, a device is shown, in which, under certain conditions, the motor coupled with the pump acts as a generator, so that excess hydraulic energy is converted to electric energy and can thus be recovered.

U.S. Pat. No. 5,281,774 A describes a control device for a hydraulic elevator, in which the electric motor that drives the pump is controlled by an inverter.

A hydraulic elevator with a pressure accumulator is also known from U.S. Pat. No. 5,579,868 A. In one of the embodiments of this elevator, a first pump is connected between the hydraulic drive for the elevator and the pressure accumulator and is used to control the flow of hydraulic oil between the hydraulic drive and the pressure accumulator. The first pump is coupled with a hydraulic motor, by which a controllable split stream of the hydraulic oil flows to the tank, such that energy is produced from the pressure difference during the depressurization of the hydraulic oil from the hydraulic drive or pressure accumulator to the unpressurized tank, and this energy is used in the operation of the first pump. Hydraulic oil can be conveyed from the tank to the pressure accumulator to refill the pressure accumulator over and over again.

In WO 98/34,868 and corresponding U.S. Pat. No. 6,142,259, the pump for conveying hydraulic oil in a hydraulic elevator is operated by an electronic power regulating unit. Power regulating units of this type are also known as variable-frequency inverters.

Another device for operating a hydraulic elevator is known from WO 99/33740 and corresponding U.S. Pat. No. 6,347,515. In this case, a pump and four line branches, each with an electrically actuated valve, are installed between the hydraulic drive and the pressure accumulator. When the elevator is moving up, two of the valves must be opened, and when it is moving down, the other two valves must be opened. The pressure accumulator apparently has three pressure spaces, which is more clearly evident from the application FR 2 773 141 A, on which the priority of WO 99/33740 is based. How the speed is controlled remains unclear. It may be assumed that large pressure surges occur when the four electrically controllable valves are actuated.

SUMMARY OF THE INVENTION

The object of the invention is to simplify the hydraulic circuit for a hydraulic elevator and to lower the electric energy demand, especially the peak demand, i.e., the electric installed load, and to develop a control and automatic regulation method that allows an elevator of this type to be operated in an energy-saving and simultaneously comfortable way.

The object of the present invention is met by a hydraulic elevator including a hydraulic drive for moving a car, a pressure accumulator, a pressure switch connected for detecting pressure in the pressure accumulator, and a pump connected to the pressure accumulator by an accumulator line and connected to the hydraulic drive by a cylinder line for producing a flow of hydraulic fluid between the hydraulic drive and the pressure accumulator for moving the car. A motor is connected to the pump and driven by a power regulating unit for driving the pump and a control/automatic regulation unit generates a signal for controlling the power regulating unit. The hydraulic elevator also includes a tank holding a hydraulic fluid, a charging pump driving by an electric motor for charging the pressure accumulator with hydraulic fluid from the tank in response to the pressure switch, a cylinder line stop valve comprising an electrically switchable on-off valve connected between the cylinder line and the pump, an accumulator line stop valve comprising an electrically switchable on-off valve connected between the accumulator line and the pump, a first pressure sensor for detecting a pressure in the cylinder line, and means for varying pressure between the pump and the cylinder line stop valve and between the pump and the accumulator line stop valve when the elevator car is at a standstill such that pressure differences at the accumulator line stop valve and the cylinder line stop valve may be substantially eliminated before opening the cylinder line stop valve and the accumulator line stop valve.

Embodiments of the invention are explained in greater detail below with reference to the drawings.

BRIEF DESCRIPTION OF THE DRAWINGS

In the drawings, wherein like reference characters denote similar elements throughout the several view.

DETAILED DESCRIPTION OF THE PREFERRED EMBODIMENTS

Figure 1:
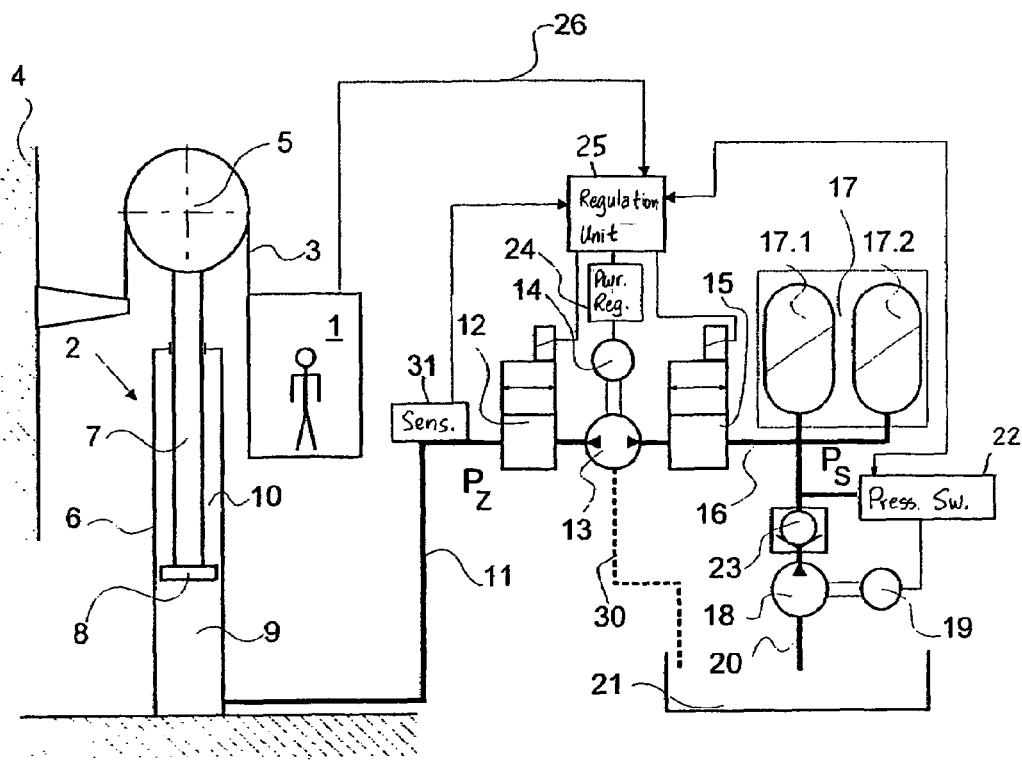
FIG. 1 is a block diagram of a hydraulic elevator according to the present invention.

In FIG. 1, an elevator car 1 can be moved by a hydraulic drive 2. Power is transmitted from the hydraulic drive 2 to the car 1 by the well-known means of a cable 3 that turns on a pulley 5 mounted on the hydraulic drive 2. One end of the cable 3 is secured to a part of the building 4, but it may also be secured on the guide rails (not shown) for the elevator car 1. Different well-known arrangements of the cable 3 and pulleys 5 are possible in accordance with the invention. In this regard, FIG. 1 shows only one example. Direct drive of the car 1 by the hydraulic drive, as shown in WO 98/34,868, is also possible.

The hydraulic drive 2 consists of a cylinder 6, in which a piston 8 mounted on a piston rod 7 can be moved. The end of the piston rod 7 opposite the piston 8 supports the pulley 5. The interior space of the cylinder 6 is divided by the piston 8 into a first pressure space 9 and a second pressure space 10. The drive 2 of the embodiment shown here is a so-called plunger cylinder, in which the two pressure spaces 9 and 10 are connected. In other words, the piston 8 is not sealed against the inner wall of the cylinder 6. A seal is present at the point where the piston rod 7 extends from the hydraulic drive 2, which means that the pressure space 10 is sealed. In this cylinder design, the hydraulically effective cross section corresponds to the cross section of the piston rod 7.

A cylinder line 11 is connected to the first pressure space 9 and connects this pressure space 9 with a cylinder line stop valve 12. This cylinder line stop valve 12 is an electrically actuated ON-OFF valve, e.g., a solenoid valve. The cylinder line stop valve 12 is connected on the other side with a pump 13, which is powered by an electric motor 14. The other connection of the pump 13 is connected to an accumulator line stop valve 15, which is also an electrically actuated ON-OFF valve. This accumulator line stop valve 15 is connected to an accumulator line 16, which leads to a pressure accumulator 17, which comprises at least one pressure accumulator 17.1. The drawing shows another pressure accumulator 17.2, which is connected in parallel with the first pressure accumulator 17.1. The number of pressure accumulators 17.1, 17.2, 17.$n$ contained in the pressure accumulator 17 advantageously conforms, for example, to the required storage capacity, which is related to the maximum distance that must be traveled by the car 1. The greater the maximum possible travel distance is, the more pressure accumulators 17.1, 17.2, 17.$n$ are contained in the pressure accumulator 17. Both bladder accumulators and piston accumulators may be considered for use as pressure accumulators 17.

A branch of the accumulator line 16 leads to a charging pump 18, which is powered by an electric motor 19. The charging pump 18 is also connected with a tank 21 by a tank line 20. Hydraulic oil can be conveyed from the tank 21 into the pressure accumulator 17 by the charging pump 18. It is advantageous for the electric motor 19 that drives the charging pump 18 to be automatically controlled by a pressure switch 22. The pressure switch 22 is installed in the accumulator line 16 and thus detects its pressure, which is designated $P_S$. If the pressure $P_S$ drops below a preset lower value, the pressure switch 22 turns on the electric motor 19, so that the charging pump 18 pumps hydraulic oil from the tank 21 into the pressure accumulator 17, which causes the pressure $P_S$ to rise until it has reached a preset upper value, after which the charging pump 18 is turned off again. Accordingly, the charging pump 18 must run only when the pressure $P_S$ in the pressure accumulator 17 is too low. The pressure $P_S$ can drop, on the one hand, as a result of unavoidable leakage losses through the charging pump 18 and, on the other hand, as a result of a drop in the temperature of the hydraulic oil due to environmental influences. If the temperature of the hydraulic oil rises due to environmental influences, the pressure $P_S$ also rises. Since this sort of temperature increase never happens very quickly, it would not be absolutely necessary to provide a pressure relief valve between the pressure accumulator 17 and the tank 21, by which hydraulic oil can be drained into the tank 20 if the pressure $P_S$ rises. The leakage losses of the charging pump 18 are sufficient in themselves to prevent the pressure $P_S$ from rising too sharply. Nevertheless, a pressure relief valve may be installed for safety reasons, as will be shown later. It is advantageous to install a nonreturn valve 23 between the charging pump 18 and the pressure accumulator 17. This nonreturn valve 23 prevents leakage loss through the charging pump 18, and then the aforesaid pressure relief valve is necessary in any case. Additional system parts that are relevant to safety, such as pipe-break safety devices and emergency bleeding, are neither shown nor described, because these types of elements are irrelevant to the essence of the invention.

As has already been mentioned, the pressure accumulator 17 is a bladder or piston accumulator. Its pressure $P_S$ varies as a function of the movement of the car 1. However, this is not a disadvantage with respect to the control and automatic regulation of the travel distance and speed of the car 1. It is possible to use well-known means to automatically regulate the travel distance and speed of the car 1, for example, to use the signal of a flowmeter (not shown here), which is placed in the cylinder line 11. However, this automatic regulation can also be accomplished by a sensor for the speed of the motor 14 or the speed of the car 1.

Advantageously, the predetermined values at which the pressure switch 22 turns the electric motor 19 on and off can be changed by a control/automatic regulation unit 25.

The pressure $P_Z$ present in the cylinder line 11 corresponds to the pressure in the first pressure space 9 of the hydraulic drive 2. This pressure is correlated with the load of the car 1.

Since, in accordance with the invention, the pump 13 is installed between the cylinder line 11 and the accumulator line 16, when the cylinder line stop valve 12 is in the ON position during operation of the elevator, the pressure $P_Z$ in the cylinder line 11, and thus in the hydraulic drive 2, acts directly on the pump 13 on one side, and, when the accumulator line stop valve 15 is also in the ON position during operation of the elevator, the pressure $P_S$ in the accumulator line 16, and thus in the accumulator 17, acts directly on the pump 13 on the other side. Thus, in contrast to the prior art, control valves are not necessary for regulating the speed. The hydraulic circuit is thus simplified compared to this prior art. Therefore, the electric power required for the motor 14 to drive the pump 13 is correlated with the pressure difference $P_Z-P_S$ when the pump 13 is pumping hydraulic oil from the pressure accumulator 17 to the hydraulic drive 2, and with the pressure difference $P_S-P_Z$ when the pump 13 is pumping hydraulic oil from the hydraulic drive 2 to the pressure accumulator 17. The pressure differences $P_Z-P_S$ and $P_S-P_Z$ can be negative by all means, in which case the pump 13 is driven by the pressure difference itself. In this way, the motor 14 can act as a generator, as is already well known. For this advantageous energy recovery to be possible, the motor 14 is driven by the well-known means of a power regulating unit 24, which, for example, is a variable-frequency inverter. The power regulating unit 24 is controlled by the control/automatic regulation unit 25, which in turn receives commands from an elevator control system, which is not shown in the drawing. Only the control line 26 is shown, through which the commands from the operating panel of the elevator system are transmitted to the control/automatic regulation unit 25.

If the elevator car 1 is stopped, the cylinder line stop valve 12 and the accumulator line stop valve 15, both of which can be actuated by the control/automatic regulation unit 25, are closed. Accordingly, when the elevator car 1 is at a standstill, they are not actuated.

If the car 1 is to move downward, the control/automatic regulation unit 25 opens the cylinder line stop valve 12 and the accumulator line stop valve 15, and the motor 14 is operated in its first direction of rotation, so that the pump 13 pumps hydraulic oil from the pressure space 9 to the pressure accumulator 17. In this case, the pressure difference $P_S-P_Z$ acts across the pump. At the same time, this means that electric energy for the operation of the motor 14 must be consumed only as long as the pressure $P_Z$ is less than the pressure $P_S$. Since a speed control valve is unnecessary, a corresponding pressure loss also does not occur. This has a positive effect on the overall efficiency and thus makes energy-saving operation of the elevator possible.

If the car 1 is to move upward, the control/automatic regulation unit 25 likewise opens the cylinder line stop valve 12 and the accumulator line stop valve 15, and the motor 14 is operated in its second direction of rotation, so that the pump 13 pumps hydraulic oil from the pressure accumulator 17 to the pressure space 9. In this case, the pressure difference $P_Z-P_S$ acts across the pump. At the same time, this means that electric energy for the operation of the motor 14 must be consumed only as long as the pressure $P_S$ is less than the pressure $P_Z$.

Since basically only an amount of electric drive power corresponding to the given pressure difference $P_S-P_Z$ or $P_Z-P_S$ must be consumed, the electric installed load for the motor 14 can be very much smaller than in conventional hydraulic circuits. Consequently, the motor 14 needed to operate the pump 13 can have a lower nominal rating. This results in cost advantages for the motor 14 itself, lower charges for the installed load due to the smaller installed load, and lower charges for power consumed due to the reduced consumption of electric energy. In accordance with the invention, another problem that is avoided is that once hydraulic oil has been brought to high pressure by a pump, it is not depressurized again in the direction of the tank 21 and thus does not give up or lose its potential energy.

Another advantage is that the tank 21 can be designed with small dimensions. It actually serves only to receive a differential amount of hydraulic oil that corresponds to the leakage losses. These leakage losses can drain into the tank through a leakage line 30.

The pressure $P_Z$ in the cylinder line 11 is detected by a load pressure sensor 31 and transmitted to the control/automatic regulation unit 25. The aforementioned pressure switch 22 evaluates the pressure $P_S$ in the accumulator line 16. The pressure switch 22 also has the function of a pressure sensor. The pressure in the accumulator line 16 that is determined in this way is also transmitted to the control/automatic regulation unit 25. The control/automatic regulation unit 25 thus knows the two pressures $P_Z$ and $P_S$ and is able to take these pressures into consideration in the control and automatic regulation of the elevator, which will be explained later.

The solution in accordance with the invention has the additional noteworthy advantage that a proportionally relay-controllable valve is not necessary to operate the hydraulic elevator. In many conventional hydraulic elevator systems, separate relay-controllable valves are present for upward and downward travel. This expense is avoided by the invention. Therefore, the open-loop and closed-loop control system is also very simple and easy to understand, because the speed of the car 1 is controlled and automatically regulated by only a single element, namely, the motor 14.

It was noted earlier that the cylinder line stop valve 12 and the accumulator stop valve 15 must be opened to operate the elevator, i.e., to move the car 1. In other words, if the car 1 is to be started from a standstill, the cylinder line stop valve 12 and the accumulator line stop valve 15 must be opened. This operational situation, i.e., the opening of the cylinder line stop valve 12 and the accumulator line stop valve 15, is critical with respect to the pressure conditions and demands special control measures. The reasons for this are explained below.

When the car 1 is stopped, the cylinder line stop valve 12 and the accumulator line stop valve 15 are initially closed. At the cylinder line stop valve 12, the pressure $P_Z$ is present on the side of the valve facing the drive 2, while the pressure $P_S$ is present at the accumulator line stop valve 15 on the side of the valve facing the pressure accumulator 17. The pressure at each of the other two valve connections, i.e., at the valve connections that face the pump, is not clearly established. After the car 1 has been stopped for an extended period of time, the pressure will have dropped due to the leakage losses of the pump 13. On the one hand, a pressure difference that previously existed between the two sides of the pump 13 has ceased to exist, so that the same pressure prevails at the connections of the cylinder line stop valve 12 and the accumulator stop valve 15 that face the pump 13. On the other hand, the pressure has decreased, in the extreme case virtually completely, due to the draining of hydraulic oil into the tank through the leakage line 30, so that a pressure that barely differs from atmospheric pressure now prevails inside the pump 13 and at its two connections to the cylinder line stop valve 12 and to the accumulator line stop valve 15.

As a result of this, when the cylinder line stop valve 12 and the accumulator line stop valve 15 are opened, sudden pressure changes occur, which also manifest themselves as unpleasant noises. The sudden pressure changes also produce considerable stress on the pump 13, which can have an adverse effect on its operation and service life. As has already been mentioned, these problems are obviously also present in the object of WO 99/33,740 A, in which a total of four valves must be switched. The problems produced in this way are eliminated and comfortable operation is made possible by the control method described below.

In accordance with the invention, the available means, such as the pump 13, the motor 14, the pressure switch 22, the power regulating unit 24, and the control/automatic regulation unit 25, are also used to avoid these sudden pressure changes. Other than the load pressure sensor 31, no additional means are necessary.

As has already been mentioned, in the initial state of the car 1, when it is stopped, the cylinder line stop valve 12 and the accumulator line stop valve 15 are closed, and the electric motor 14 of the pump 13 is not running. If the car 1 is to be started, then, in a first step of the method, the electric motor 14 of the pump 13 is controlled in such a way that it builds up a pressure at the pump-side connection of the accumulator line stop valve 15. This buildup of pressure is effected by running the motor 14 and pump 13 slowly in that direction of rotation that causes hydraulic oil to be conveyed in the direction of the accumulator line stop valve 15. Of course, only a minimal amount of hydraulic oil is conveyed, because the cylinder line stop valve 12 and the accumulator stop valve 15 are closed. Nevertheless, the desired pressure buildup occurs. The motor 14 is driven for only a very short period of time. This period of time is referred to as the first compensation time $t_{A1}$ (see FIG. 2). It was found that a running time of about 100 to 300 ms at a reduced speed of rotation $n_{red}$ is sufficient to develop a pressure approximately equal to the pressure $P_S$ in the accumulator line 16. When, in a second step of the method, the accumulator line stop valve 25 is then opened, a sudden pressure change does not occur, so that the previously described problem caused by the opening of the accumulator line stop valve 15 does not exist.

After expiration of the compensation time $t_{A1}$, the motor 14 and thus the pump 13 have stopped running again. In a third step of the method, which begins with the expiration of the compensation time $t_{A1}$, the motor 14 remains magnetized, which is achieved by suitable control of the power regulating unit 14 by the control/automatic regulation unit 25. The pump 13 is thus capable of absorbing torque without it actually beginning to rotate. In other words, at that instant, the pressure $P_S$ in the accumulator line 16 prevails on the side of the pump 13 that faces the accumulator line stop valve 15, while on the side of the pump 13 that faces the cylinder line stop valve 12, a more or less indefinite pressure prevails, which in the original initial state was scarcely different from atmospheric pressure and was then further reduced in an undetermined way by the running of the motor 14 for the duration of the compensation time $t_{A1}$.

The period of time during which the motor 14 remains magnetized without rotating is referred to as the second compensation time $t_{A2}$. During this compensation time $t_{A2}$, the pressure difference between the two sides of the pump 13 can then diminish as a result of internal leakage losses inside the pump 13. It was found that this second $t_{A2}$ should be about 200 ms. At the end of the second compensation time $t_{A2}$, the pressure on the side of the cylinder line stop valve 12 facing the pump 13 is then about the same as the pressure $P_S$ in the accumulator line 16, while the pressure $P_Z$ in the cylinder line 11 prevails on the other side of the cylinder line stop valve 12. Since the pressures $P_S$ and $P_Z$ are of the same order of magnitude, the cylinder line stop valve 12 can now be opened without causing a sudden pressure change of such a magnitude that problems arise due to pressure surges and noise.

The cylinder line stop valve 12 and the accumulator line stop valve 15 are thus now open. By controlling the motor 14 of the pump 13 by the power regulating unit 2, the travel of the car 1 can now begin, perhaps after another compensation time $t_{A3}$. The compensation time $t_{A3}$ can be about 200 ms, but it is not really necessary.

Figure 2:
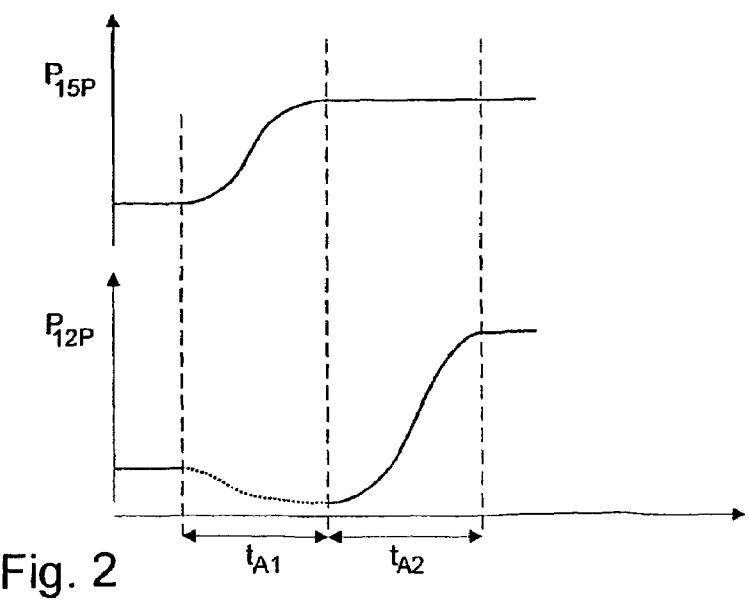
FIG. 2 is a graph showing the pressure at stop valves of the hydraulic elevator over time.

FIG. 2 shows the behavior of the pressure on both sides of the pump 13 in the form of graphs. The upper part of the graph shows the behavior of the pressure at the pump-side connection of the accumulator line stop valve 15. This pressure is designated $P_{15P}$. During the first compensation time $t_{A1}$, this pressure rises. The lower part of the graph shows the behavior of the pressure at the pump-side connection of the cylinder line stop valve 12. It rises during the second compensation time $t_{A2}$.

The method described here for preparing to start the car 1 proceeds in the same way regardless of whether the car 1 is to be moved up or down.

When the car 1 is moving, the cylinder line stop valve 12 and the accumulator line stop valve 15 continue to be electrically controlled. The travel of the car 1 up and down is now controlled and automatically regulated solely by control and automatic regulation of the direction and speed of rotation of the motor 14 by the power regulating unit 24.

The values for the first compensation time $t_{A1}$, the second compensation time $t_{A2}$, the possible third compensation time $t_{A3}$, and the speed of rotation $n_{red}$ are empirically determined and stored in the control/automatic regulation unit 25. The cylinder line stop valve 12, the accumulator line stop valve 15, and the motor 14 of the pump 13 are thus controlled with values empirically determined in this way.

Figure 3:
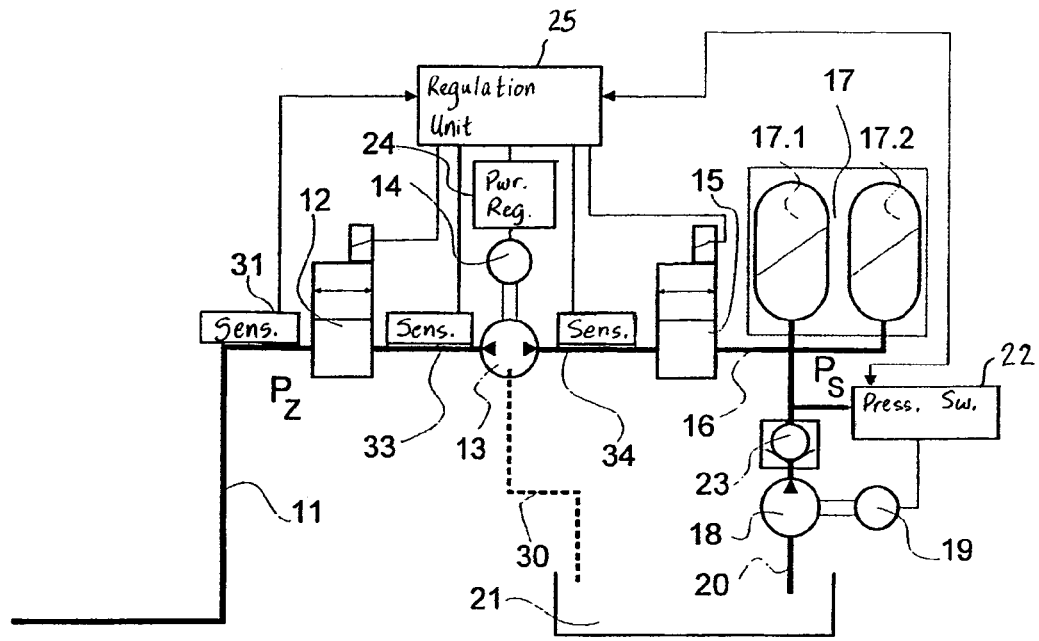
FIG. 3 is a block diagram of a hydraulic elevator according to another embodiment of the present invention.

However, it can also be advantageous to use automatic regulation for the process initiated before the start of travel of the car 1 (FIG. 1). This type of automatic regulation is possible if another pressure sensor is provided on both sides of the pump 13 in each of the lines to the cylinder line stop valve 12 and to the accumulator line stop valve 15, as is shown in FIG. 3, which represents a portion of FIG. 1. A new feature here, compared to FIG. 1, is the use of another pressure sensor 33, with which the pressure in the section of the line between the cylinder line stop valve 12 and the pump 13 can be measured and transmitted to the control/automatic regulation unit 25. Also new is another pressure sensor 34, with which the pressure in the section of the line between the accumulator line stop valve 15 and the pump 13 can be measured and transmitted to the control/automatic regulation unit 25. With these two additional pressure sensors 33 and 34, it is now possible to effect automatic regulation, as opposed to control, of the pressures $P_{15P}$ and $P_{12P}$. Accordingly, in the aforementioned first step of the method, the pump 13 is not operated for a preset first compensation time $t_{A1}$, but rather the pump 13 is operated for the precise amount of time required for the pressure $P_{15P}$ produced by the running of the pump 13 at the pump-side connection of the accumulator line stop valve 15 to be exactly the same as the pressure $P_S$ in the accumulator line 16.

The same applies to the pressure $P_{12P}$. Here, consistent with the previously described control solution, during the second compensation time $t_{A2}$, there is first an increase in the pressure $P_{12P}$ until a value is reached that corresponds to the pressure $P_S$ in the accumulator line 16. Advantageously, however, it is now additionally possible to adjust this pressure to the actual pressure $P_Z$ in the cylinder line 11 by further operation of the motor 14. If the pressure $P_S$ in the accumulator line 16 is lower than the pressure $P_Z$ in the cylinder line 11, then, in an additional step of the method, the motor 14 is again operated, specifically, in such a way that the pump 13 pumps hydraulic oil towards the cylinder line stop valve 12 precisely until the pressure $P_{12P}$ is exactly the same as the pressure $P_Z$ in the cylinder line 11. If the pressure $P_S$ in the accumulator line 16 is higher than the pressure $P_Z$ in the cylinder line 11, then, in this additional step of the method, the motor 14 is operated in such a way that the pump 13 pumps hydraulic oil towards the accumulator line stop valve 15 precisely until the pressure $P_{12P}$ is exactly the same as the pressure $P_Z$ in the cylinder line 11. In both cases, the result is that the pressure is the same on both sides of the cylinder line stop valve 12, so that the subsequent opening of the cylinder line stop valve 12 produces absolutely no pressure change.

A solution of this type is also especially advantageous if, after a number of years of operation of the elevator, individual pieces of equipment, for example, the pump 13, must be replaced. The newly installed pump 13 could show different leakage behavior, so that, properly speaking, the predetermined values for the compensation times $t_{A1}$ and $t_{A2}$ would have to be corrected. However, this type of improved solution is also advantageous with respect to the effect of temperature. Since the hydraulic oil can have different temperatures during the operation of the elevator, and the leakage behavior of the pump 13 also depends on the temperature of the hydraulic oil, the automatic regulation of the pressures $P_{15P}$ and $P_{12P}$ that has just been described results in improved operating behavior. However, it should be emphasized that this automatic regulation in place of the previously mentioned control is usually not necessary.

Figure 4A:
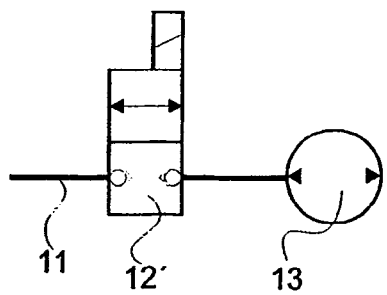
FIGS. 4a–4c show cylinder line stop valves which may be used in the elevator according to the present invention.
Figure 4B:
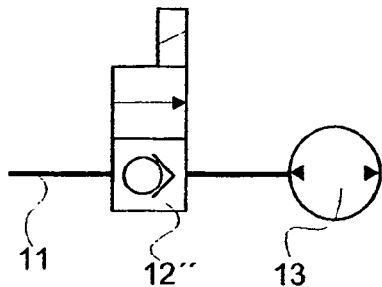
Figure 4C:
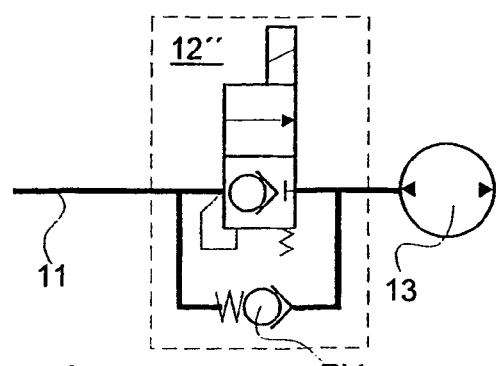

FIG. 4a–4c show three alternative solutions with respect to the cylinder line stop valve 12. FIG. 4a shows a cylinder line stop valve 12', whose symbolic representation indicates that it is a double-stopping ON-OFF stop valve. Flow can be achieved only if the cylinder line stop valve 12' is electrically controlled. Therefore, it must be electrically controlled for both upward travel and downward travel of the car 1.

FIG. 4b shows another cylinder line stop valve 12", whose symbolic representation indicates that it is a single-stopping ON-OFF stop valve. It is designed in such a way that it automatically opens when the pump 13 pumps hydraulic oil into the cylinder line 11. As soon as the pump 13 stops pumping, it closes again. The flow of hydraulic oil from the cylinder line 11 in the direction of the pump 13, on the other hand, is possible only when the cylinder line stop valve 12" is electrically actuated. A nonreturn valve may thus be integrated in the cylinder line stop valve 12".

Alternatively, however, the cylinder line stop valve 12" may consist of an ON-OFF valve and a nonreturn valve RV connected in parallel with it, as illustrated in FIG. 4c. The combination of the ON-OFF valve and the parallel-connected nonreturn valve RV then constitutes the cylinder line stop valve 12".

If a cylinder line stop valve 12" of this type is used in combination with FIG. 1 or FIG. 3, the cylinder line stop valve 12" does not need to be electrically controlled when the pump 13 is pumping hydraulic oil in the direction of the hydraulic drive 2 (FIG. 1). This constitutes an advantage if the cylinder line stop valve 12" then opens automatically. In this way, the above-described problem of a sudden pressure change cannot even arise. This means that the previously described second compensation time $t_{A2}$ does not need to be provided in the control process at all. The control process is thus advantageously simplified without any disadvantageous consequences.

For upward travel of the car 1, the cylinder line stop valve 12" requires no electrical actuation at all, for it automatically remains open as long as the pump 13 is pumping hydraulic oil in the direction of the hydraulic drive 2. If the motor 14 is shut off at the end of the upward travel of the car 1, the cylinder line stop valve 12" closes automatically.

Figure 5A:
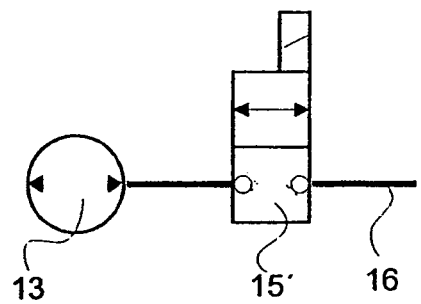
FIGS. 5a–5b show accumulator line stop valves which may be used in the elevator according to the present invention.
Figure 5B:
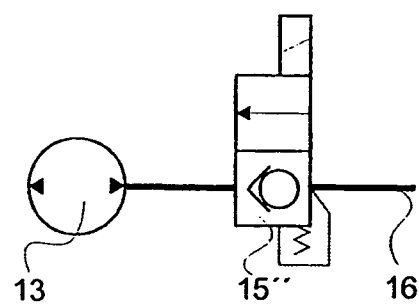

Comparable design variants are also advantageous with respect to the accumulator line stop valve 15. In FIG. 5a, the accumulator line stop valve 15' is a double-stopping valve, and in FIG. 5b, the accumulator line stop valve 15" is a single-stopping valve. A design of the accumulator line stop valve 15" analogous to FIG. 4c is also possible. The mechanism of action is analogous to that of the cylinder line stop valve 12' or 12". If the accumulator line stop valve 15 is a double-stopping valve 15', as shown in FIG. 5a, it must be electrically controlled if flow through this valve is to be achieved. If, on the other hand, it is designed as a single-stopping accumulator line stop valve 15", as shown in FIG. 5b, then it must be electrically controlled only if flow from the pressure accumulator 17 (FIGS. 1 and 3) through the accumulator line 16 to the hydraulic drive 2 (FIG. 1) is to be achieved. In this case, however, if, as described above, the electric motor 14 of the pump 13 is controlled in such a way in the first step of the method that it develops a pressure at the pump-side connection of the accumulator line stop valve 15", then the nonreturn valve of the accumulator line stop valve 15" is automatically opened as soon as the pressure $P_{15P}$ exceeds the pressure $P_S$ in the accumulator line 16. Thus, the motor 14 is not driven according to a predetermined value of the first compensation time $t_{A1}$. The motor 14 is first turned on, but it is not turned off again after expiration of the first compensation time $t_{A1}$, but rather, in this advantageous embodiment, the motor 14 is shut off when the pressure $P_S$ in the accumulator line 16 rises somewhat, which can be determined by the pressure sensor contained in the pressure switch 22 and thus can also be detected by the control/automatic regulation unit 25. The second step of the method, the opening of the accumulator line stop valve 15", thus does not then have to be specially initiated. During the following step of the method, i.e., during the course of the second compensation time $t_{A2}$, the accumulator line stop valve 15" is electrically controlled to prevent it from now closing again due to the leakage loss through the pump 13, which leads to the buildup of the pressure $P_{12P}$ at the pump-side connection of the cylinder line stop valve 12, since this closing would prevent this buildup of the pressure $P_{12P}$. The accumulator line stop valve 15" must thus remain open until the cylinder line stop valve 12' or 12" has been actuated.

However, when the car 1 begins to travel following the opening of the cylinder line stop valve 12' or 12", the accumulator line stop valve 15" must continue to be electrically controlled only in the case of upward travel of the car 1. In the case of downward travel of the car 1, the electrical control of the accumulator line stop valve 15" is not necessary, because the nonreturn valve of the accumulator line stop valve 15" automatically remains open due to the pressure produced by the pump 13, which must be higher than the pressure $P_S$ in the accumulator line 16. The accumulator line stop valve 15" automatically closes again only at the end of the downward travel, when the motor 14 is stopped.

Figure 6:
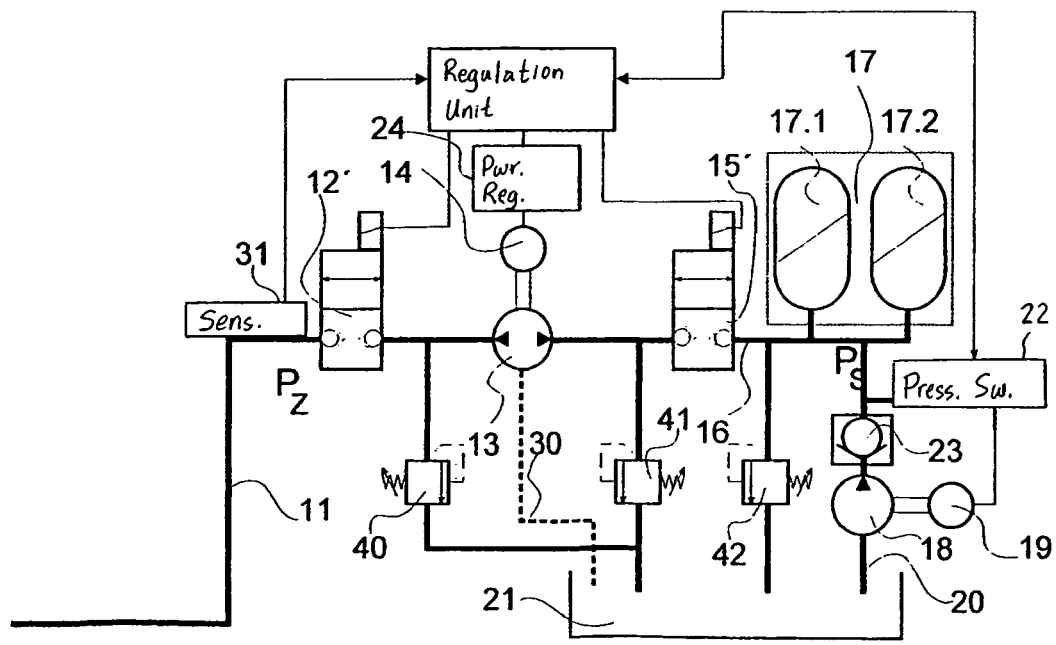
FIGS. 6 is a block diagram of another embodiment of a hydraulic system which can be used with a hydraulic elevator.

FIG. 6 shows a block diagram of another hydraulic system, in which both the cylinder line stop valve 12' and the accumulator line stop valve 15' are double-stopping valves. Since, due to their design, these two valves 12' and 15' cannot be opened by the pressure produced by the pump 13, a connection to a first pressure relief valve 40 must be present between the pump 13 and the pump-side connection of the cylinder line stop valve 12', and a connection to a second pressure relief valve 41 must be present between the pump 13 and the pump-side connection of the accumulator line stop valve 15'. This prevents the pressure from becoming too high in the lines between the pump 13 and the pump-side connection of the cylinder line stop valve 12', on the one hand, and between the pump 13 and the pump-side connection of the accumulator line stop valve 15', on the other hand. The pressure produced by the pump 13 is thus limited under all conditions to the pressure at which the first pressure relief valve 40 or the second pressure relief valve 41 opens.

For safety reasons, a cylinder line pressure relief valve 42 is also similarly connected to accumulator line 16 to prevent an excessively high pressure from developing in the accumulator line 16 and in the pressure accumulator 17. This accumulator line pressure relief valve 42 is not shown in FIGS. 1 and 3, but it is also present in those systems for safety reasons. The important consideration here is how the second pressure relief valve 41 and the accumulator line pressure relief valve 42 are to be designed. Since the pump 13 has a large pumping capacity to make it possible to achieve the maximum rate of travel of the car 1 (FIG. 1) of, for example, 1 m/s, it is advantageous for the second pressure relief valve 41 to have a large nominal diameter that conforms to this large pumping capacity.

By contrast, the charging pump 18 has a smaller pumping capacity, because its function consists only in compensating leakage losses. Accordingly, it is advantageous for the accumulator line pressure relief valve 42 to have a correspondingly small nominal diameter.

Figure 7:
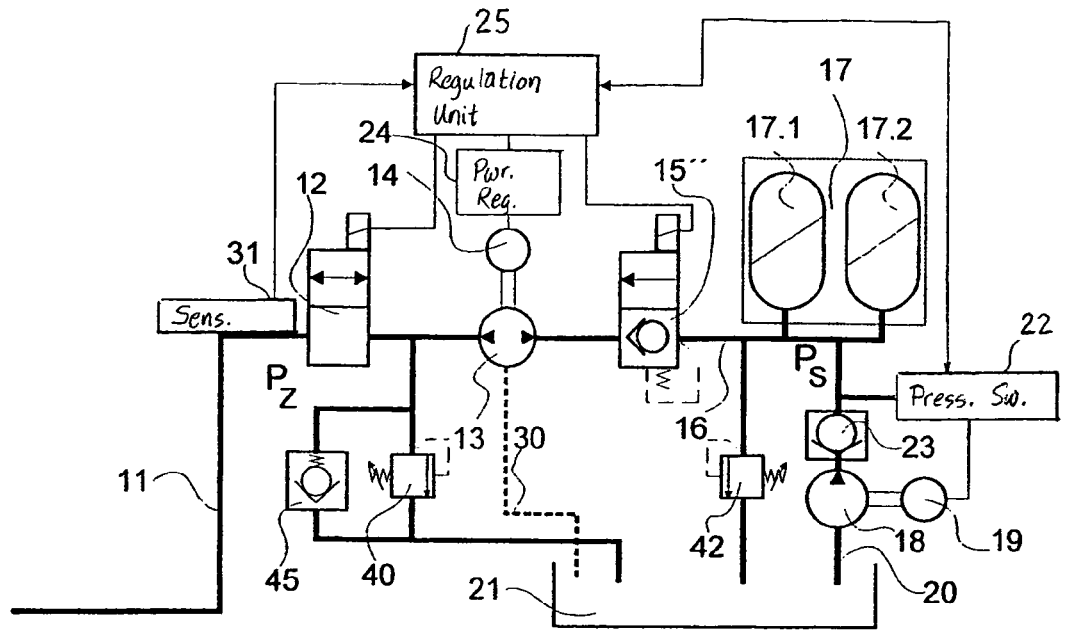
FIG. 7 is a block diagram of a further embodiment of a hydraulic system which can be used with a hydraulic elevator.

FIG. 7 shows a block diagram of another advantageous hydraulic system, in which the accumulator line stop valve 15" is a single-stopping valve, as shown in FIG. 5*b*. The second pressure relief valve 41 shown in FIG. 6 is not present here. It is unnecessary for the following reasons. If the pump 13 produces a high pressure at the pump-side connection of the accumulator line stop valve 15", this pressure does not have to be relieved by a second pressure relief valve 41, for in this case the pressure is applied to the accumulator line stop valve 15", so that the resulting pressure can be reduced by the accumulator line pressure relief valve 42. Of course, in this case, the accumulator line pressure relief valve 42 must have a large nominal diameter, because under certain conditions it must divert the entire pumping capacity of the pump 13.

Consequently, the use of the single-stopping accumulator line stop valve 15" has the additional advantage that it eliminates the need for one pressure relief valve.

FIG. 7 also shows a feed valve 45 connected in parallel with the first pressure relief valve 40. This feed valve 45 has the advantage that, when the pump 13 conveys hydraulic oil to the accumulator line stop valve 15" in the method described above for preparing for the car 1 to travel, it prevents the development of a negative pressure in the line between the cylinder line stop valve 12 and the pump 13.

Figure 8:
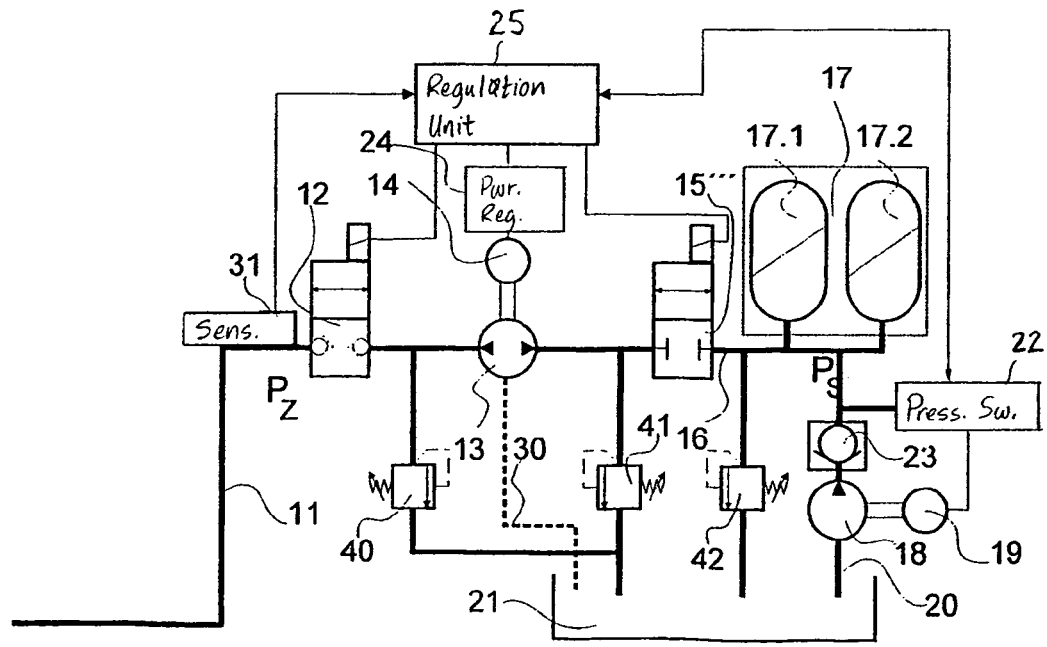
FIG. 8 is a block diagram of yet another embodiment of a hydraulic system which can be used with a hydraulic elevator.

FIG. 8 shows a variant of the hydraulic block diagram shown in FIG. 6. Compared to FIG. 6, the accumulator line stop valve 15''' again has a different design. It is a so-called nonleak-free valve 15''' due to its different design. As a result of this design, leakage occurs at the accumulator line stop valve 15''' when the pump 13 is stopped. Accordingly, a pressure that is correlated with the leakage develops on the side that faces the accumulator line stop valve 15'''. As a result, when the pump 13 is stopped, leakage also occurs at the pump 13, and this leakage is drained into the tank 21 through the leakage line 30. The prerequisite for this design is that the leakage at the accumulator line stop valve 15''' must be smaller than the leakage of the pump 13. This is due to the fact that a pressure develops on the side of the pump 13 that faces the accumulator line stop valve 15'''. This pressure corresponds to the pressure in the accumulator line 16 and to the ratio of the leakages of the pump 13 and the accumulator line stop valve 15'''. This pressure also acts on the shaft seal of the pump 13. With standard pumps, it may not exceed a certain value. If it cannot be guaranteed that the leakage at the accumulator line stop valve 15''' will be smaller than the leakage of the pump, then the pump 13 that is used must be of a special design with a particularly heavy-duty shaft seal.

This example shows that the design of the pump 13 may make a difference under certain conditions. Screw pumps are generally used for hydraulic elevators. However, in a hydraulic elevator with the designs described above, it may be advantageous to use an internal gear pump as the pump 13, because this type of pump has a compact design and very good volumetric efficiency and overall efficiency.

However, it may also be advantageous to use a screw pump as pump 13. If a pump 13 of this design is used, then the leakage line 30 can be eliminated, because leakage occurs in pumps of this type only between the high-pressure and low-pressure space of the pump 13.

The embodiments shown above are executed with a specific cable arrangement and with a plunger cylinder as the hydraulic drive 2. However, as was noted at the beginning, with respect to the equipment and method, the solutions in accordance with the invention are not limited to these solutions. Both direct drive of the elevator car 1 by the hydraulic drive 2 and other designs of the hydraulic drive 2, such as drawing or compressing cylinders and double-acting cylinders, are accessible to the advantageous developments in accordance with the invention.

What is claimed is:

1. A hydraulic elevator, comprising:
    a hydraulic drive for moving a car;
    a pressure accumulator;
    a pressure switch connected for detecting pressure in said pressure accumulator;
    a pump connected to said pressure accumulator by an accumulator line and connected to said hydraulic drive by a cylinder line for producing a flow of hydraulic fluid between said hydraulic drive and said pressure accumulator for moving the car;
    a motor connected to said pump and driven by a power regulating unit for driving said pump;
    a control/automatic regulation unit generating a signal for controlling said power regulating unit;
    a tank holding a hydraulic fluid;
    a charging pump driving by an electric motor for charging said pressure accumulator with hydraulic fluid from said tank in response to said pressure switch;
    a cylinder line stop valve comprising an electrically switchable on-off valve connected between said cylinder line and said pump;
    an accumulator line stop valve comprising an electrically switchable on-off valve connected between said accumulator line and said pump;
    a first pressure sensor for detecting a pressure in said cylinder line; and
    means for varying pressure between said pump and said cylinder line stop valve and between said pump and said accumulator line stop valve when said elevator car is at a standstill such that pressure differences at said accumulator line stop valve and said cylinder line stop valve are substantially eliminatable before opening said cylinder line stop valve and said accumulator line stop valve.

2. The hydraulic elevator of claim 1, wherein said cylinder line stop valve is a double-stopping cylinder line stop valve.

3. The hydraulic elevator of claim 1, wherein said cylinder line stop valve is a single-stopping cylinder line stop valve.

4. The hydraulic elevator of claim 1, wherein said cylinder line stop valve is a single-stopping cylinder line stop valve including an ON-OFF valve and a parallel-connected non-return valve.

5. The hydraulic elevator of claim 1, wherein said accumulator line stop valve is a double-stopping cylinder line stop valve.

6. The hydraulic elevator of claim 1, wherein said accumulator line stop valve is a single-stopping cylinder line stop valve.

7. The hydraulic elevator of claim 1, wherein said accumulator line stop valve is a single-stopping cylinder line stop valve including an ON-OFF valve and a parallel-connected nonreturn valve.

8. The hydraulic elevator of claim 1, further comprising a second pressure sensor installed between said cylinder line stop valve and said pump for measuring a pressure between said cylinder line stop valve and said pump, said second pressure sensor being connected to said control/automatic regulation unit.

9. The hydraulic elevator of claim 8, further comprising a third pressure sensor installed between said accumulator line stop valve and said pump for measuring a pressure between said accumulator line stop valve and said pump, said third pressure sensor being connected to said control/automatic regulation unit.

10. A method for controlling and automatically regulating a hydraulic elevator, wherein the hydraulic elevator comprises a hydraulic drive for moving a car, a pressure accumulator, a pressure switch connected for detecting pressure in the pressure accumulator, a pump connected to the pressure accumulator by an accumulator line and connected to the hydraulic drive by a cylinder line for producing a flow of hydraulic fluid between the hydraulic drive and the pressure accumulator for moving the car, a motor connected to the pump and driven by a power regulating unit for driving the pump, a control/automatic regulation unit generating a signal for controlling the power regulating unit, a tank holding a hydraulic fluid, a charging pump driving by an electric motor for charging the pressure accumulator with hydraulic fluid from the tank in response to the pressure switch, a cylinder line stop valve comprising an electrically switchable on-off valve connected between the cylinder line and the pump, an accumulator line stop valve comprising an electrically switchable on-off valve connected between the accumulator line and the pump, and a first pressure sensor for detecting a pressure in the cylinder line, said method comprising the steps of:
  operating the electric motor of the pump to build up pressure at a pump-side connection of the accumulator line stop valve such that the pump side connection of the accumulator line stop valve is approximately the same pressure as the pressure in the accumulator line;
  opening the accumulator line stop valve;
  maintaining the motor in a magnetized state; and
  opening the cylinder line stop valve.

11. The method of claim 10, wherein said step of operating the electric motor comprises operating the electric motor for a first compensation time period.

12. The method of claim 11, wherein the first compensation time period is a fixed time period in the range from 100 to 300 ms.

13. The method of claim 11, wherein the electric motor is operated at a reduced speed during the first compensation time period.

14. The method of claim 11, wherein said step of maintaining the motor in a magnetized state includes maintaining the motor in a magnetized state for a second compensation time period.

15. The method of claim 14, wherein the second compensation time period is a fixed time period that is approximately 200 ms.

16. The method of claim 10, wherein said step of maintaining the motor in a magnetized state includes maintaining the motor in a magnetized state for a second compensation time period.

17. The method of claim 16, wherein the second compensation time period is a fixed time period that is approximately 200 ms.

18. The method of claim 10, further comprising the step of starting travel of the car upward or downward after the expiration of a third compensation time period, the third compensation time period starting after the accumulator stop control valve and the cylinder line stop valve are opened.

19. The method of claim 18, wherein the third compensation time period is a fixed time period not greater than approximately 300 ms.

20. The method of claim 11, wherein a duration of the first compensation time period terminates when the pressure at the pump-side connection of the accumulator line stop valve is the same as the pressure in the accumulator line.

21. The method of claim 20, further comprising the step of operating the motor of the pump, after the step of opening the accumulator line stop valve, such that the pump conveys hydraulic oil toward the cylinder line stop valve until the pressure at the pump-side of the cylinder line stop valve is the same as the pressure in the cylinder line, when the pressure in the accumulator line is lower than the pressure in the cylinder line.

22. The method of claim 20, further comprising the step of operating the motor of the pump, after the step of opening the accumulator line stop valve, such that the pump conveys hydraulic oil toward the accumulator line stop valve until the pressure at the pump side of the cylinder line stop valve is the same as the pressure in the cylinder line, when the pressure in the accumulator line is higher than the pressure in the cylinder line.

23. The method of claim 11, further comprising the step of operating the motor of the pump, after the step of opening the accumulator line stop valve, such that the pump conveys hydraulic oil toward the cylinder line stop valve until the pressure at the pump-side of the cylinder line stop valve is the same as the pressure in the cylinder line, when the pressure in the accumulator line is lower than the pressure in the cylinder line.

24. The method of claim 11, further comprising the step of operating the motor of the pump, after the step of opening the accumulator line stop valve, such that the pump conveys hydraulic oil toward the accumulator line stop valve until the pressure at the pump side of the cylinder line stop valve is the same as the pressure in the cylinder line, when the pressure in the accumulator line is higher than the pressure in the cylinder line.

* * * * *